United States Patent [19]

Nishikawa et al.

[11] Patent Number: 4,488,446
[45] Date of Patent: Dec. 18, 1984

[54] TRANSMISSION APPARATUS FOR A VEHICLE

[75] Inventors: Masao Nishikawa, Tokyo; Torao Hattori; Takashi Aoki, both of Wako; Hiroshi Yoshizawa, Kamifukuoka, all of Japan

[73] Assignee: Honda Giken Kogyo Kabushiki Kaisha, Tokyo, Japan

[21] Appl. No.: 379,923

[22] Filed: May 19, 1982

[30] Foreign Application Priority Data

May 20, 1981 [JP] Japan .................................. 56-74798

[51] Int. Cl.³ ............................................. F16H 3/08
[52] U.S. Cl. ....................................... 74/330; 74/331; 74/360; 74/359; 74/358; 74/333
[58] Field of Search ................ 74/330, 331, 333, 334, 74/357, 358, 359, 360

[56] References Cited

U.S. PATENT DOCUMENTS

| | | | |
|---|---|---|---|
| 2,972,899 | 2/1961 | Wiggermann | 74/331 X |
| 3,106,273 | 10/1963 | Doerfer et al. | 74/330 X |
| 3,916,714 | 11/1975 | Sisson et al. | 74/360 X |
| 4,252,031 | 2/1981 | Nishimura et al. | 74/360 |

FOREIGN PATENT DOCUMENTS

| | | | |
|---|---|---|---|
| 610844 | 12/1960 | Canada | 74/330 |
| 190394 | 6/1957 | Fed. Rep. of Germany | 74/330 |
| 857524 | 9/1940 | France | 74/330 |
| 491975 | 3/1954 | Italy | 74/360 |
| 604178 | 6/1948 | United Kingdom | 74/330 |
| 1225267 | 3/1971 | United Kingdom | 74/360 |
| 0743901 | 6/1980 | U.S.S.R. | 74/333 |

Primary Examiner—Allan D. Herrmann
Assistant Examiner—Dirk Wright
Attorney, Agent, or Firm—Armstrong, Nikaido, Marmelstein & Kubovcik

[57] ABSTRACT

A transmission apparatus for a vehicle comprising a casing, an input shaft, an output shaft parallel to the input shaft having at least four gear trains interposed between the two shafts through respective clutches, at least one of the respective clutches being an in-common clutch used in common to two of the at least four gear trains, and at least one selection mechanism provided separately from the common clutch. The two gear trains are those differentiated in change speed stage one from another by three stages. The two gear trains are arranged so that in the case of power transmission through any selected gear train other than the two gear trains, such one of the two gear trains that has a change speed stage nearer the change speed stage of the selected gear train has been selected by the selection mechanism.

5 Claims, 6 Drawing Figures

TRANSMISSION APPARATUS FOR A VEHICLE

BACKGROUND OF THE INVENTION

This invention relates to a transmission apparatus for a vehicle having an input shaft connected to an internal combustion engine, an output shaft connected to a driving wheel of the vehicle, and plural gear trains of different change speed stages interposed between the two shafts through respective clutches.

There has been known an arrangement, as shown in FIG. 1 for instance, of a transmission apparatus having four gear trains d-R, d-1, d-2, d-3 for a one-reverse stage and three-forward stages interposed between an input shaft a and an output shaft b through respective clutches c-1, c-2, c-3. The clutch c-2 for the second speed gear train for the forward middle speed stage is arranged to be a common clutch used also as a clutch for the reverse gear train d-R so that these two gear trains d-R, d-2 may be interposed selectively between the input and the output shafts a, b through the common clutch c-2 and a selection mechanism e provided separately therefrom. Thus, an intention of shortening of the axial size of the transmission apparatus is achieved by omitting a clutch for exclusive use for the backward driving. It becomes possible to mount the resultant transmission apparatus on a small-sized horizontal front engine-front drive type motorcar which restricts the axial size of a transmission apparatus to be mounted thereon. Referring to the same FIGURE, P denotes a gear for parking.

To thus decrease the number of clutches by omitting the clutch for exclusive use for the backward driving is advantageous not only in lightening the weight of the apparatus but also in decreasing in a total amount of loss torque caused by a clutch dragging phenomenon. However, the foregoing apparatus is inconvenient in that when the selection mechanism e is changed over to the reverse driving side and the common clutch c-2 is engaged to effect the backward driving, a friction plate on the input side of the clutch c-3 for the 3rd speed gear train of a forward high speed stage is rotated at a high speed in accordance with rotation of the input shaft a through the 3rd speed gear train d-3, and a relative rotation speed thereof through the 3rd speed gear train d-3, and a relative rotation speed thereof in relation to a friction plate on the output side of the clutch c-3 rotated together with the rotation of the output shaft b becomes very high, and thereby a loss torque caused by the dragging phenomenon is increased.

This loss torque problem should be taken into consideration also in such a case that the number of forward change speed stages in a transmission apparatus is increased to 4 stages or 5 stages and a common use of clutches for those forward gear trains is intended. Also in this case, consideration has to be taken on the influence over driveability by a time lag caused when the gear trains are selectively changed over by a selector.

OBJECTS AND SUMMARY OF THE INVENTION

The present invention has an object to provide a transmission apparatus which is decreased in size and weight by a decrease in the number of individual clutches needed.

Further, it is an object of the present invention to provide a transmission apparatus wherein the case of power transmission through a particular selected gear train, at least two gear trains having their respective change speed stages which are nearer that of the selected gear train are interposed between the input and output shaft.

It is a still further object to provide a transmission apparatus wherein a rapid change speed can be effected.

It is another object of the present invention to provide a transmission apparatus wherein the torque loss caused by a dragging phenomenon of the clutches in the transmission is decreased as much as possible.

These objects and others which will become readily apparent to those of skill in the art are obtained in a transmission apparatus comprising a casing, an input shaft in the casing connected to an engine of the vehicle and output shaft in the casing disposed parallel to the input shaft and connected to a driving wheel of the vehicle, at least four gear trains of different change speed stages interposed between the two shafts through respective clutches, at least one of these clutches being arranged to be an in-common clutch used in common to two of the at least four gear trains so that the two gear trains may be selectively interposed between the two shafts through a common clutch and at least one selection mechanism. The two gear trains are those differentiated in change speed one from another by three stages. The two gear trains are so arranged that, in the case of power transmission through any selective gear train other than the two gear trains, the one of the two gear trains that has the change speed stage nearer the change speed stage of the selected gear train is selected by the selection mechanism.

The at least four gear trains can comprise a reverse gear train, a first gear train, a second gear train, a third gear train, and a fourth gear train. The at least one in-common clutch can comprise a first clutch in common with the reverse gear train and the third gear train and a second clutch in common with the first speed gear train and the fourth speed gear train. The at least one selection mechanism can comprise a first selection mechanism cooperating with the first clutch and a second selection mechanism cooperating with the second clutch.

Alternatively, the at least four gear trains can comprise the reverse gear train, a first speed gear train, a second speed gear train, a third speed gear train, a fourth speed gear train, and a fifth speed gear train. The at least one in-common clutch can comprise a first clutch in common with the reverse gear and the third speed gear train, a second clutch in common with the first speed gear train and the fourth speed gear train, and a third clutch in common to the second speed gear train and the fifth speed gear train. The at least one selection mechanism can comprise the first selection mechanism cooperating with the first clutch, the second selection mechanism cooperating with the second clutch, and a third selection mechanism cooperating with the third clutch. The first selection mechanism and the second selection mechanism can be arranged to be moved in conjunction one with another.

As another alternative, the at least four gear trains can comprise a reverse gear train, a first speed gear train, a second speed gear train, and a third speed gear train. The at least one in-common clutch can comprise the first clutch which is in common to the reverse gear train and the third speed gear train.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
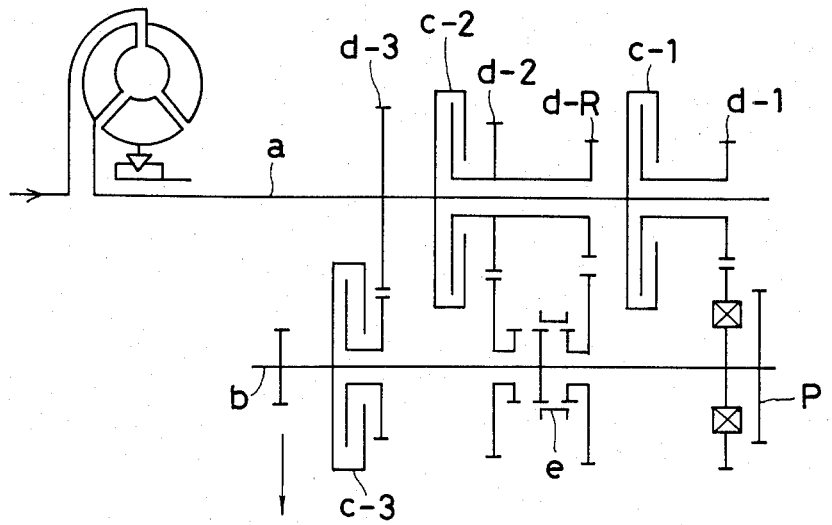
FIG. 1 is a diagrammatic view showing a conventional transmission apparatus.
Figure 3:
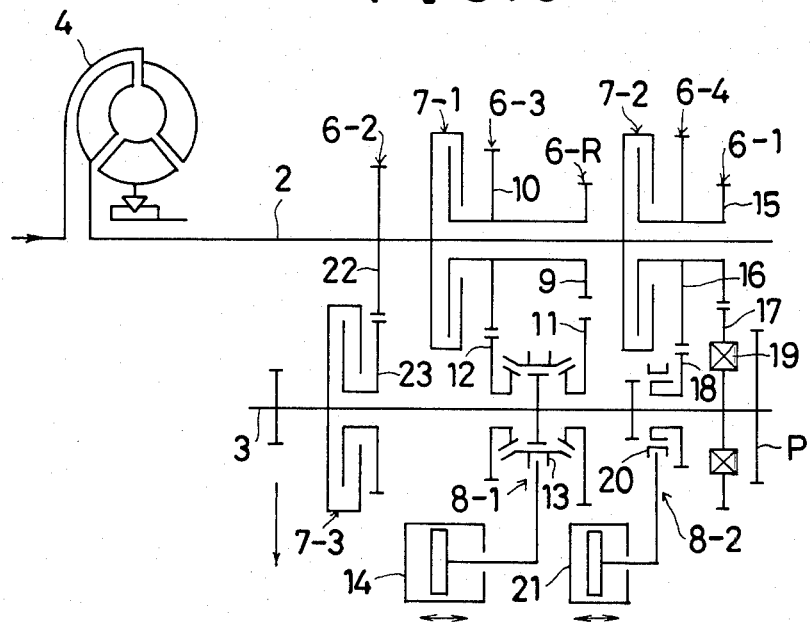
FIG. 3 is a diagrammatic view showing the transmission system of FIG. 2.
Figure 2:
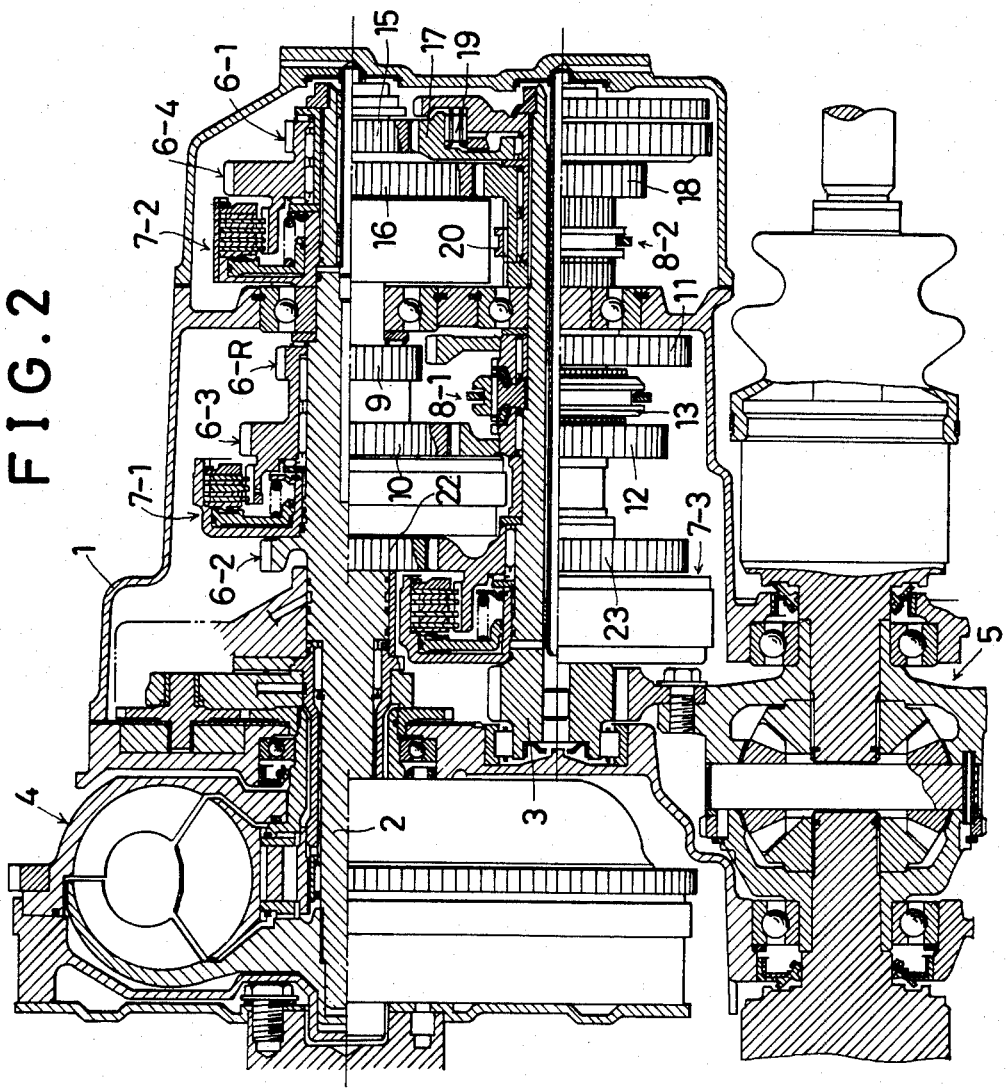
FIG. 2 is a sectional side view of a first embodiment of the present invention.

Referring to FIGS. 2 and 3, a transmission casing 1 houses an input shaft 2 and an output shaft 3 so as to be in parallel with one another. The input shaft 2 is connected to an internal combustion engine through a torque convertor 4, and the output shaft 3 is connected to a driving wheel of a vehicle through a differential gear 5. Additionally, five gear trains 6-R, 6-1, 6-2, 6-3, 6-4 of one backward stage and four forward stages are disposed between the two shafts 2, 3. The two gear trains 6-R, 6-3 for the reverse and the 3rd speed which are differentiated by three stages one from another in their change speed stages and the two gear trains 6-1, 6-4 for the first speed and the fourth speed which are also differentiated by three stages one from another are respectively connected in common to a first clutch 7-1 and a second clutch 7-2 which are mounted on the input shaft 2. First and second selection mechanisms 8-1, 8-2 are respectively interposed between the respective two gear trains 6-R, 6-3, 6-1, 6-4 and the output shaft 3.

More in detail, the reverse gear train 6-R and the third speed gear train 6-3 have respective driving gears 9, 10 mounted on the input shaft 2 and respective driven gears 11, 12 mounted on the output shaft 3. The two driving gears 9, 10 are combined together into a unit for being connected to the first clutch 7-1. The two driven gears 11, 12 are connected selectively to the output shaft 3 through the first selection mechanism 8-1 interposed between the two gears 11, 12 and the output shaft 3 so that only the gear train having the driven gear selected by the selection mechanism 8-1 may be effectively interposed between the input and the output shafts 2, 3.

The first selection mechanism 8-1 comprises a synchromesh mechanism having a shift gear 13 for connecting selectively the gears 11, 12 to the output shaft 3 as shown in FIG. 3, and is so operable in conjunction with a first servo means 14 shown in FIG. 3, as to be changed over between the rightward reverse driving side for selecting the reverse gear train 6-R and the leftward third speed side for selecting the third speed gear train 6-3.

An idler gear not illustrated is interposed between the driving gear 9 and the driven gear 11 of the reverse gear train 6-R.

The foregoing first speed gear train 6-1 and fourth speed gear train 6-4 have respective driving gears 15, 16 mounted on the input shaft 2 and respective driven gears 17, 18 mounted on the output shaft 3, and are connected at the driving gears 15, 16 integrally one with another to the output side of the second clutch 7-2. This arrangement is not especially different from that of the reverse driving gear train 6-R and third speed gear train 6-3 as mentioned above. In this case, however, the second selection mechanism 8-2 is composed of a one-way clutch 19 interposed between the first driven gear 17 and the output shaft 3 for allowing over running of the output shaft 3, and a shift gear 20 interposed between the fourth speed driven gear 18 and the output shaft 3, so that under the condition that the shift gear 20 is operated to be changed over from the rightward first speed side to the leftward fourth speed side in conjunction with movement of a second servo means 21 shown in FIG. 3. In this manner, the fourth speed driven gear 18 is connected to the output shaft 3, the connection between the first speed driven gear 17 and the output shaft 3 is substantially cut off by the action of the one-way clutch 19.

The foregoing second speed gear train 6-2 has a driving gear 22 fixed to the input shaft 2 and a driven gear 23 mounted on the output shaft 3, and is connected at the driven gear 23 to a third clutch 7-3 mounted on the output shaft 3. Thus, the second speed gear train is always interposed between the input shaft 2 and the output shaft 4 through the third clutch 7-3.

The first, second and third clutches 7-1, 7-2, 7-3 and the first and the second servo means 14, 21 may be oil pressure operated or electro-magnetically operated. These are arranged to be operated as described below in conjunction with a related operation of a shift lever (not illustrated) that is shifted, for instance, to a P range for parking, a R range for reverse driving, a N range for neutral and a D range for automatic change speed.

Namely, if the shift lever is in the P range or the N range, the first selection mechanism 8-1 is changed over to the reverse driving side by the first servo means 14, and the second selection mechanism 8-2 is changed over to the first speed side by the second servo means 21, so that there are interposed between the input and output shafts 2, 3 the reverse driving gear train 6-R, the first speed gear train 6-1, and the second speed gear train 6-2. In this case, however, the respective clutches 7-1, 7-2 and 7-3 are all disengaged, so that no power transmission between the two shafts 2, 3 is effected. In the P range, a pawl means not illustrated is brought into engagement with the parking gear P for keeping the vehicle in its stopped condition.

If the shift lever is shifted to the R range, under the same condition as in the N range, the first clutch 7-1 is engaged so that there is effected a backward driving resulted from a power transmission through the reverse driving gear train 6-R.

If the shift lever is shifted to the D range, firstly, the second clutch 7-2 is engaged under the same condition as that of the N range for effecting a forward driving at the first speed caused by a power transmission through the first speed gear train 6-1, and then the third clutch 7-3 is engaged for effecting a forward driving at the second speed gear train 6-2 by means of a control circuit for an automatic shaft.

In the case of this second speed stage driving, if the first selection mechanism 8-1 is changed over to the third speed side by the first servo 14, and thereby the third speed gear train 6-3 having a change speed stage which is nearer the change speed stage of the second speed gear train 6-2 is interposed, in place of the reverse driving gear train 6-R, between the input and output shafts 2, 3 and the first clutch 7-1 is engaged, there is immediately effected a forward driving at the third speed stage by a power transmission through the third speed gear train 6-3.

In the case of this third speed stage driving, if the second selection mechanism 8-2 is changed over to the fourth speed side by the second servo means 21, and thereby the fourth speed gear train 6-4 having a change speed stage which is nearer that of the third speed gear train 6-3 is interposed, in place of the first speed gear train 6-1 between the input and output shafts 2, 3 and the second clutch 7-2 is engaged, there is effected immediately a forward driving at the fourth speed stage by a power transmission through the fourth speed gear train 6-4.

The foregoing operations can be summarized as shown on the following Table 1.

TABLE I

| Shift | Clutch | | | Gear Train | | | | | |
|---|---|---|---|---|---|---|---|---|---|
| Range | 1st | 2nd | 3rd | Reverse | 1st Sd. | 2nd Sd. | 3rd Sd. | 4th Sd. | P |
| P | — | — | — | 0 | 0 | 0 | — | — | 0 |
| R | 0 | — | — | 0 | 0 | 0 | — | — | — |
| N | — | — | — | 0 | 0 | 0 | — | — | — |
| D 1st Sd. | — | 0 | — | 0 | 0 | 0 | — | — | — |
| 2nd Sd. | — | — | 0 | — | 0 | 0 | 0 | — | — |
| 3rd Sd. | 0 | — | — | — | — | 0 | 0 | 0 | — |
| 4th Sd. | — | 0 | — | — | — | 0 | 0 | 0 | — |

As will be clear from the Table 1, at any change speed stage driving, other two gear trains having their respective change speed stages which are nearer that of the gear train serving to transmit the power have been interposed between the input and output shafts, so that a rapid change speed caused by another gear train can be given by changing over the clutches, without producing any time lag owing to a changeover of the respective selection mechanisms 8-1, 8-2. Additionally, in the embodying example, the second speed stage and the third speed stage are ready to be operated in driving at the fourth speed stage, so that it will be clearly appreciated that it is also possible to make a rapid kick-down operation from the fourth speed stage to the third speed stage or further to the second speed stage.

A torque loss caused by a dragging phenomenon of each of the clutches connected to the other two gear trains is decreased as much as possible because a relative rotation speed between the input side and the output side of each clutch becomes small, because of the fact that the two other gear trains have their change speed stages which are nearer the change speed stage of the gear train serving to transmit the power, and by cooperation thereof with decrease in the number of the clutches there is not caused any increase of loss torque even when increase in the number of change speed stages is increased.

The reason that the first selection mechanism 8-1 is constructed to be a synchromesh mechanism is to achieve a synchronuous meshing thereof with the respective driven gears 11, 12 for the rearward driving and the third speed which rotate in the mutually opposite directions at the time of changing over operation for shifting between the second speed and the first speed. Thereby, there can be prevented such a generation of meshing noise that would be caused on meshing in the case where the same is not a synchromesh type one.

Figure 4:
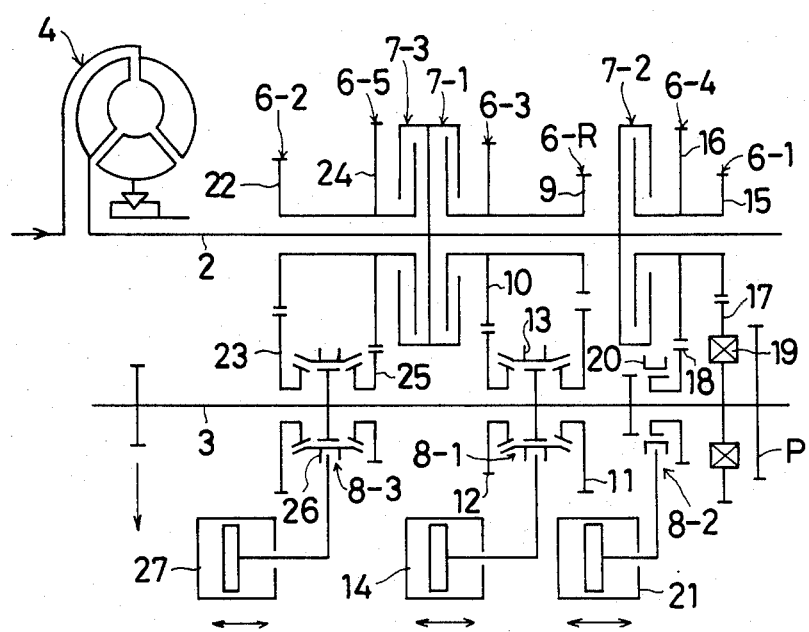
FIG. 4 is a diagrammatic view showing a transmission system of a second embodiment of the present invention.

FIG. 4 shows another embodiment wherein this invention is applied to a transmission apparatus having in total six gear trains 6-R, 6-1 . . . 6-5 of one reverse stage and five forward stages. In this example, the two gear trains 6-2, 6-5 for the second speed and the fifth speed are connected together, at their respective driving gears 22, 24 mounted on the input shaft 2, into an integral one for connecting to a third clutch 7-3 mounted on the input shaft 2, and respective driven gears 23, 25 mounted thereof on the output shaft 3 through a third selection mechanism, 8-3. The remaining portions of the apparatus are not different from those of the foregoing embodiment. Here, the third selection mechanism 8-3 comprises a synchromesh mechanism having a shift gear 26, and is arranged to be operated to change over between the leftward second speed side and the rightward fifth speed side by means of a third servo means 27 as shown in FIG. 4. The third clutch 7-3 and the first clutch 7-1 are constructed to be a double clutch of which an outer element is used in common to those clutches so that the axial directional size of the apparatus may be shortened.

The operations of this example are shown on the following Table 2.

TABLE II

| Shift | Clutch | | | Gear Train | | | | | | |
|---|---|---|---|---|---|---|---|---|---|---|
| Range | 1st | 2nd | 3rd | Reverse | 1st | 2nd | 3rd | 4th | 5th | P |
| P | — | — | — | 0 | 0 | 0 | — | — | — | 0 |
| R | 0 | — | — | 0 | 0 | 0 | — | — | — | — |
| N | — | — | — | 0 | 0 | 0 | — | — | — | — |
| D 1st Sd. | — | 0 | — | 0 | 0 | 0 | — | — | — | — |
| 2nd Sd. | — | — | 0 | — | 0 | 0 | 0 | — | — | — |
| 3rd Sd. | 0 | — | — | — | — | 0 | 0 | 0 | — | — |
| 4th Sd. | — | 0 | — | — | — | — | 0 | 0 | 0 | — |
| 5th Sd. | — | — | 0 | — | — | — | 0 | 0 | 0 | — |

Figure 5:
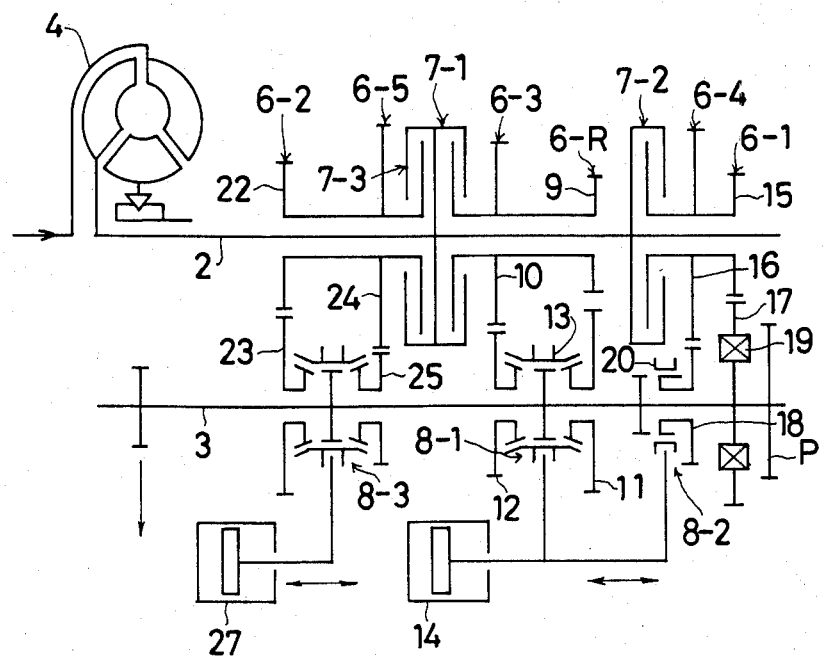
FIG. 5 is a diagrammatic view showing a transmission system of a third embodiment of the present invention.

FIG. 5 shows a modified example of the second embodiment of FIG. 4. In this example, the second selection mechanism 8-2 is arranged to be operated also by the first servo means 14 for operating the first selection mechanism 8-1, with the intension of simplifying a control mechanism. The operations thereof are as shown on the following Table 3.

TABLE III

| Shift | Clutch | | | Gear Train | | | | | | |
|---|---|---|---|---|---|---|---|---|---|---|
| Range | 1st | 2nd | 3rd | Reverse | 1st | 2nd | 3rd | 4th | 5th | P |
| P | — | — | — | 0 | 0 | 0 | — | — | — | 0 |
| R | 0 | — | — | 0 | 0 | 0 | — | — | — | — |
| N | — | — | — | 0 | 0 | 0 | — | — | — | — |
| D 1st Sd. | — | 0 | — | 0 | 0 | 0 | — | — | — | — |
| 2nd Sd. | — | — | 0 | — | 0 | 0 | 0 | — | — | — |

TABLE III-continued

| Shift Range | Clutch 1st | Clutch 2nd | Clutch 3rd | Gear Train Reverse | 1st | 2nd | 3rd | 4th | 5th | P |
|---|---|---|---|---|---|---|---|---|---|---|
| 3rd Sd. | 0 | — | — | — | — | 0 | 0 | 0 | — | — |
| 4th Sd. | — | 0 | — | — | — | — | 0 | 0 | 0 | — |
| 5th Sd. | — | — | 0 | — | — | — | 0 | 0 | 0 | — |

The difference of these operations from those in the Table 2 is that in conjunction with the operation in the second speed driving, the first selection mechanism 8-1 is changed over to the leftward third speed side by the first servo means 14, the second selection mechanism 8-2 is also changed over to the leftward fourth speed side, and thereby the fourth speed gear train 6-4 is interposed between the input and output shafts 2, 3. It becomes impossible to kick down from the second speed to the first speed. However, in the transmission apparatus with the forward 5 stages, the change speed stage itself of the second speed gear train 6-2 has such a considerable low ratio that the kickdown operation from the second speed to the first speed becomes unnecessary in practical use. Additionally when a shift-down operation from the second speed is effected according as the vehicle speed is lowered, the first servo means 14 is, firstly, moved to the rightward and thereafter the third clutch 7-3 is disengaged and the second clutch 7-2 is engaged, and the result is that there is caused more or less a time lag, but it is enough to furnish the shift-down operation just before the vehicle stops at a street crossing or the like. Thus, there is enough time to do so and there is no problem with this apparatus in practical use.

The above has been explained with reference to the case of such a complete automatic transmission apparatus that the automatic change speed at the D range of the shift lever is effected, but this invention can be similarly applicable to such a semi-automatic transmission apparatus that a change speed from each speed to another is effected by each operation of the shift lever.

Figure 6:
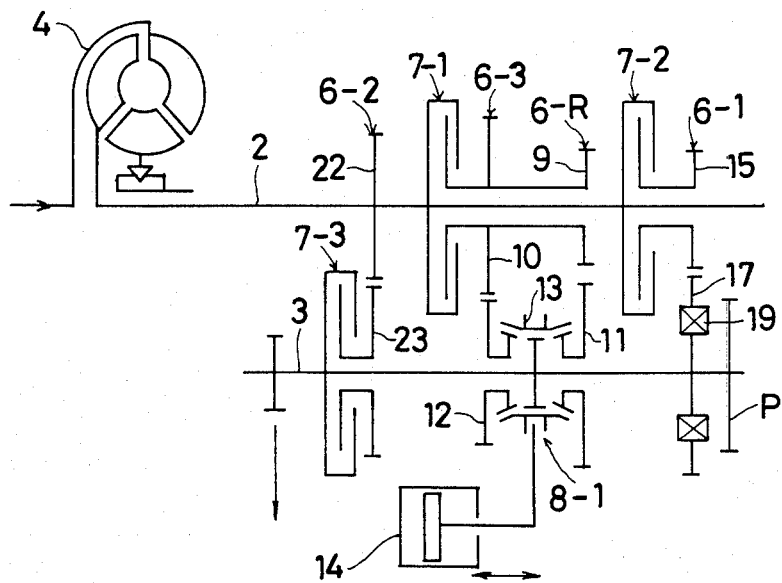
FIG. 6 is a diagrammatic view showing a transmission system of a fourth embodiment of the present invention.

Additionally, this invention can be applied to a transmission apparatus of a reverse stage and three forward stage which is so constructed that the fourth speed gear train 6-4 used in the example shown in FIGS. 2 and 3 is omitted as shown in FIG. 6. Further, this invention can be applied also to a transmission apparatus of a reverse 1 stage and forward 7 stage transmission with the number of clutches being four.

Thus, according to this invention, a transmission apparatus can be decreased in size and in weight by decrease in the number of clutches caused by a common use of the clutches. Additionally, in case of the power transmission through any selected gear train, at least two gear trains having their respective change speed stages which are nearer that of the foregoing selected gear train have been interposed between the input shaft and the output shaft. As a result, a rapid change speed can be effected and driveability can be improved. Furthermore, a torque loss caused by a dragging phenomenon of each of the clutches connected to the foregoing two gear trains is decreased as much as possible because the two gear trains have their respective change speed which are nearer that of the gear train which is transmitting the power, thereby by the cooperation with the decrease in the number of clutches, the loss torque can be much decreased and saving of fuel consumption can be improved.

It is readily apparent that the above-described transmission apparatus for a vehicle meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A transmission apparatus for a vehicle comprising a casing, an input shaft in the casing connected to an engine of the vehicle, an output shaft in the casing disposed parallel to the input shaft and connected to a driving wheel of the vehicle, at least four gear trains of different change speed stages interposed between the two shafts through respective clutches, at least one of the respective clutches being arranged to be an in-common clutch used in common to two of the at least four gear trains, so that the two gear trains may be selectively interposed between the two shafts through the common clutch and at least one selection mechanism provided separately from the in-common clutch, wherein the two gear trains are those differentiated in change speed stage one from another by three stages, and the two gear trains are so arranged that, in case of power transmission through any selected gear train other than the two gear trains, such one of the two gear trains that has a change speed stage which is nearer the change speed stage of the selected gear train has been selected by the selection mechanism.

2. A transmission apparatus as claimed in claim 1, wherein the at least four gear trains comprise a reverse gear train, a first speed gear train, a second speed gear train, a third speed gear train and a fourth speed gear train, and the at least one in-common clutch comprising a first clutch in common to the reverse gear train and the third speed gear train and a second clutch in common to the first speed gear train and the fourth speed gear train, and the at least one selection mechanism comprising a first selection mechanism cooperating with the second clutch.

3. A transmission apparatus in claim 1, wherein the at least four gear trains comprise a reverse gear train, a first speed gear train, a second speed gear train, a third speed gear train, a fourth speed gear train and a fifth speed gear train, and the at least in-common clutch comprising a first clutch in common to the reverse gear train and the third speed gear train, a second clutch in common to the first speed gear train and the fourth speed gear train, and a third clutch in common to the second speed gear train and the fifth speed gear train, and the at least one selection mechanism comprising a first selection mechanism cooperating with the first clutch, a second selection mechanism cooperating with the second clutch and a third selection mechanism cooperating with the third clutch.

4. A transmission apparatus as claimed in claim 3, wherein the first selection mechanism and the second selection mechanism are arranged to be moved in conjunction one with another.

5. A transmission apparatus as claimed in claim 1, wherein the at least four gear trains comprise a reverse gear train, a first speed gear train, a second speed gear train and a third speed gear train, and the at least one in-common clutch comprising only a first clutch which is in common to the reverse gear train and the third speed gear train.

* * * * *